US007830150B2

(12) United States Patent
Klinkert

(10) Patent No.: US 7,830,150 B2
(45) Date of Patent: Nov. 9, 2010

(54) HELICOPTER ELECTROMAGNETIC PROSPECTING SYSTEM

(76) Inventor: Philip Samuel Klinkert, 2 Doveton Rd., Parktown (ZA) 2198

( * ) Notice: Subject to any disclaimer, the term of this patent is extended or adjusted under 35 U.S.C. 154(b) by 594 days.

(21) Appl. No.: 11/587,887

(22) PCT Filed: Apr. 19, 2005

(86) PCT No.: PCT/IB2005/001031

§ 371 (c)(1),
(2), (4) Date: Jan. 25, 2008

(87) PCT Pub. No.: WO2005/106536

PCT Pub. Date: Nov. 10, 2005

(65) Prior Publication Data

US 2008/0211506 A1 Sep. 4, 2008

(30) Foreign Application Priority Data

Apr. 28, 2004 (ZA) ................................ 2004/3188

(51) Int. Cl.
*G01V 3/16* (2006.01)
*H01Q 1/30* (2006.01)

(52) U.S. Cl. ...................................... 324/330; 343/707

(58) Field of Classification Search ................. 324/330, 324/331, 323, 326, 329, 332, 334, 336, 344; 343/705, 707, 708
See application file for complete search history.

(56) References Cited

U.S. PATENT DOCUMENTS

| | | | | |
|---|---|---|---|---|
| 2,955,251 | A | 10/1960 | Shaw et al. | |
| 6,255,825 | B1 | 7/2001 | Seigel et al. | |
| 6,845,936 | B1 | 1/2005 | Mouge et al. | |
| 2005/0001622 | A1 * | 1/2005 | Morrison et al. | 324/330 |

FOREIGN PATENT DOCUMENTS

| | | | |
|---|---|---|---|
| CA | 2 232 105 | A1 | 9/1999 |
| WO | WO-99/32905 | A | 7/1999 |
| ZA | 9 811 489 | A | 6/1999 |

* cited by examiner

*Primary Examiner*—Kenneth J Whittington
(74) *Attorney, Agent, or Firm*—Lahive & Cockfield, LLP; Anthony A. Laurentano

(57) ABSTRACT

An airborne electromagnetic prospecting system (10) is disclosed. The system (10) comprises a transmitter loop structure (12) hat is attached to, and arranged to be towed by, a helicopter (14). A transmitter (22) is fitted to the transmitter loop structure (12) for transmitting a primary electromagnetic field. A high drag bird (26) is attached to, and arranged to be towed by, the transmitter loop structure (12). A receiver (38) is fitted to the high drag bird (26) for receiving a primary and secondary resulting electromagnetic field, the secondary field arising from the interaction of the primary field with ground conductors that are traversed by the helicopter (14). Significantly, the high drag bird (26) is also attached to, and arranged to be towed by, the helicopter (14), so as to keep the position of the receiver (38) relative to the transmitter (22) substantially constant.

8 Claims, 5 Drawing Sheets

66
86
78B
22
84
76
72
82
50
70

84
22
66
82
78
80

50
74
68
72
66
86
78B
22
76
168
59
76
78A
82
80
68
70

HELICOPTER ELECTROMAGNETIC PROSPECTING SYSTEM

RELATED APPLICATIONS

This application is a 35 U.S.C. 371 national stage filing of International Application No. PCT/IB2005/001031, filed 19 Apr. 2005, which claims priority to South African Patent Application No. 2004/3188 filed on 28 Apr. 2004 in South Africa. The contents of the aforementioned applications are hereby incorporated by reference.

BACKGROUND OF THE INVENTION

THIS invention relates to an airborne electromagnetic prospecting system.

There are several airborne electromagnetic prospecting systems, which are typically used to detect underground bodies, such as sulphides, which could contain economic metals, such as copper, zinc and nickel. South African patent no. 98/11489, for example, discloses a prospecting system comprising an aircraft, which is arranged to be towed by a helicopter, and a high drag bird that is connected to the aircraft and towed by the aircraft at an angle of 0approximately 14° below the aircraft.

The aircraft is fitted with a transmitter comprising a transmitter loop and associated electronics for transmitting a primary electromagnetic field, for prospecting the terrain over which the helicopter is flying. A receiver, comprising a three-component receiving coil and associated electronics, is mounted inside the high drag bird for receiving and recording a resulting field, the resulting field having interacted with the underlying terrain. The resulting field comprises a combination of the primary field from the transmitter as well as a secondary field emanating from the underground bodies. The secondary field may then be extracted and processed so as to determine the nature of the underground bodies.

The particular arrangement disclosed in patent no. 98/11489 is advantageous in that the receiver is spaced a sufficiently great distance from the transmitter so as to significantly reduce the primary field component in the resulting field. It is common knowledge that, in order to measure accurately the resulting field, the position of the receiver in the high drag bird relative to the transmitter on the aircraft should ideally remain constant. However, since in the above described arrangement, the aircraft is simply towing the high drag bird containing the receiver, the relative positions tend to vary significantly, with, in particular, variations in the airspeed playing a detrimental role. For example, if the airspeed is reduced, the drag on the high drag bird will also be reduced, and it will therefore fly at an angle greater than 14° relative to the transmitter on the aircraft. This will result in a change in the amplitudes of the primary and secondary fields at the receiver, which adversely effects the accuracy of the recorded data.

Although a small change in the primary field can be effectively compensated for by electronic or signal processing means, a large change can not, because the receiver coil and electronics must have a perfect linear response to signals of different amplitude, which in practice is difficult to achieve. A significant change in the amplitude of the secondary field from the ground results in an incorrect interpretation of the data because the geometry of the transmitter, the receiver and ground surface must be accurately known for interpretation of sub-surface conductors. This follows from the laws of physics dealing with magnetic fields and electromagnetic induction. In addition, if the airspeed falls sufficiently, the receiver bird could drop low enough for it to strike the terrain over which the helicopter is flying, especially if the survey flying height of the aircraft above the ground surface is low.

SUMMARY OF THE INVENTION

According to the invention there is provided an airborne electromagnetic prospecting system comprising:

- a transmitter loop structure that is attached to, and arranged to be towed by, a towing aircraft;
- transmitting means fitted to the transmitter loop structure for transmitting a primary electromagnetic field;
- a high drag bird attached to, and arranged to be towed by, the transmitter loop structure; and
- receiving means fitted to the high drag bird for receiving a primary and secondary resulting electromagnetic field, the secondary field arising from the interaction of the primary field with ground conductors that are traversed by the towing aircraft, wherein the high drag bird is also attached to, and arranged to be towed by, the towing aircraft, so as to keep the position of the receiving means relative to the transmitting means substantially constant.

Advantageously, a drogue is fitted to the high drag bird so as to keep the high drag bird substantially in line with the transmitter loop structure.

Typically, the transmitter loop structure includes:

- a central hub to which a carriage assembly is pivotally connected for carrying the transmitting means;
- a spider comprising a plurality of legs extending radially away from the central hub; and
- at least one transmitter loop wire extending around the plurality of legs.

Conveniently, the transmitter loop structure is attached to the towing aircraft by a tow rope assembly comprising a plurality of tow ropes that are attached to spaced apart contact regions on the transmitter loop structure, the plurality of tow ropes being conjoined at a point, which in turn is connected to the towing aircraft by a further tow rope.

In one version of the invention, the transmitter loop structure, in use, defines a horizontal plane, with a tow rope extending between the high drag bird and a peripheral point of the transmitter loop structure.

In an alternate version of the invention, the transmitter loop structure, in use, defines a substantially vertical plane, with a tow rope assembly connecting the transmitter loop structure to the high drag bird.

Preferably, the high drag bird comprises:

- a body housing the receiving means;
- a rigid nose extending from the body, for receiving a tow rope to connect the high drag bird to the transmitter loop structure; and
- a yoke assembly extending from the body, for receiving a tow rope to connect the high drag bird to the towing aircraft.

Conveniently, the high drag bird is fitted with a high drag drogue, the drogue being connected to either the body housing the receiver means or the yoke assembly.

Advantageously, the high drag bird further comprises a wing.

Typically, the towing aircraft is a helicopter.

DESCRIPTION OF EMBODIMENTS

Figure 1:
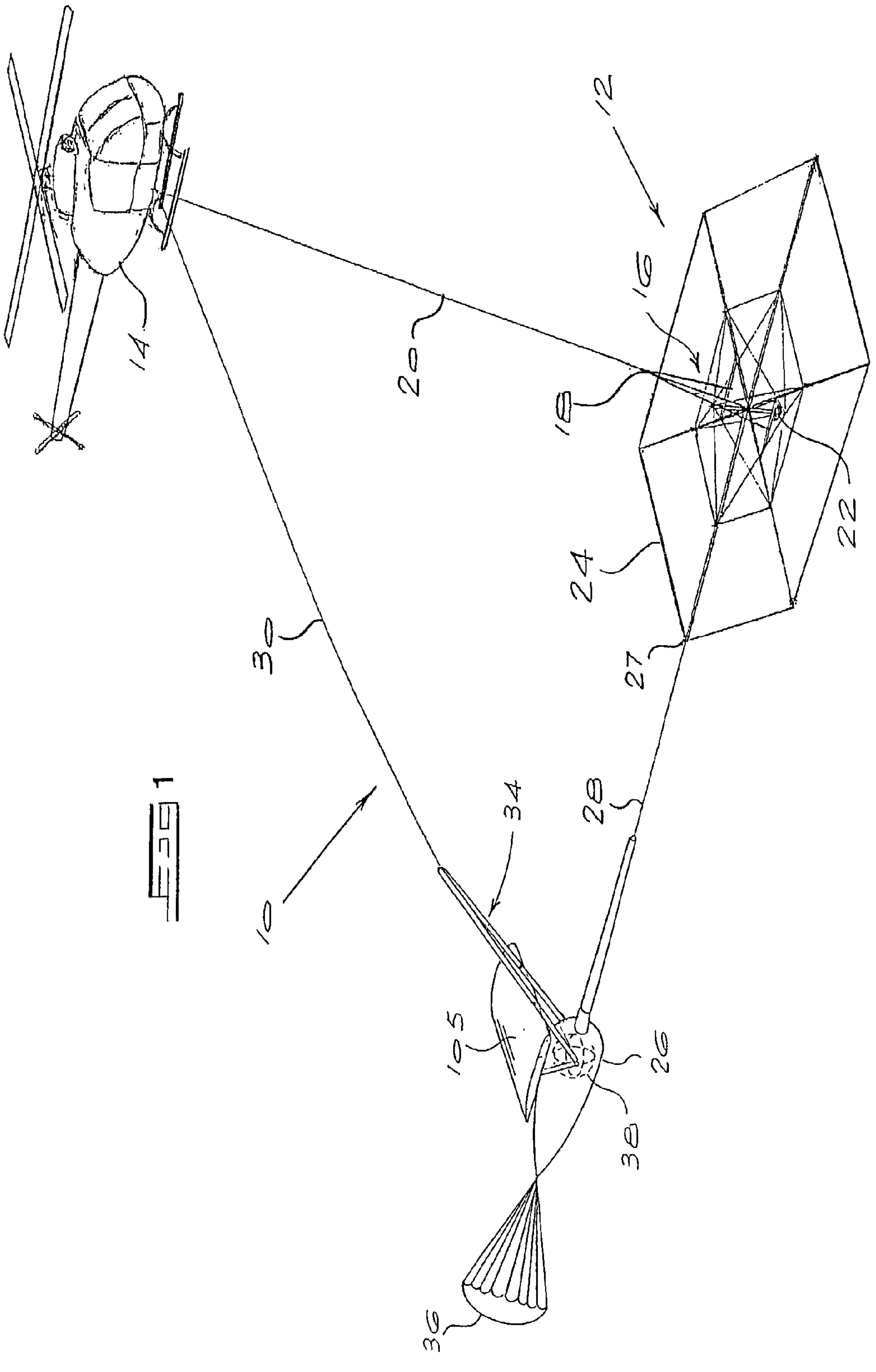
FIG. 1 shows a perspective view of an airborne electromagnetic prospecting system according to a first embodiment of the invention.

Referring first to FIG. 1, an airborne electromagnetic prospecting system 10 comprises a transmitter loop structure 12 that is connected to, and towed, by a helicopter 14. The transmitter loop structure 12 is attached to the helicopter by a tow rope assembly 16 comprising three tow ropes that are attached to spaced apart contact regions on the transmitter loop structure 12. The three ropes are conjoined at point 18, which in turn is connected to the towing aircraft 14 by a further tow rope 20.

The transmitter loop structure 12 comprises a transmitter 22, which is arranged to hang vertically below a central point of the structure 12, and a transmitter loop wire 24, which in FIG. 1 defines a horizontal plane.

A high drag bird 26 is attached to contact point 27 on the transmitter loop structure 12 by means of a tow rope 28 and to the towing aircraft 14 by means of a tow rope 30 via a yoke assembly 34. The yoke assembly 34 is advantageously arranged to reduce pitch, roll and yaw movement of the high drag bird 26.

The distance between the helicopter 14 and the yoke assembly 34 is approximately 65 m. The length of tow rope 20 is typically around 40 m, and the distance between the centre of the transmitter loop wire 24 and the receiving coils is around 30 m. However, this distance can be varied from 20 m to 60 m, depending on the type of exploration required. In this case, the length of the tow rope 30 will be shorter or longer than 65 m, with the length being selected so as to ensure that the transmitter and receiver are kept in essentially constant positions relative to each other when the helicopter 14 is flown at a range of survey speeds.

A drogue element 36 is fitted to the high drag bird 26 for keeping the distance between the transmitter and receiver coils essentially constant during flight and for ensuring good pitch, roll and yaw stability for the bird 26.

As explained above, the transmitter 22 and an auxiliary power unit (APU) is fitted to the transmitter loop structure 12 for transmitting a primary electromagnetic field. A three-component receiver coil 38, illustrated schematically, is fitted to the bird 26 for receiving a combination of the primary field from the transmitting coil 24 and an induced secondary field from the ground conductors traversed by the towing aircraft 14.

Figure 2:
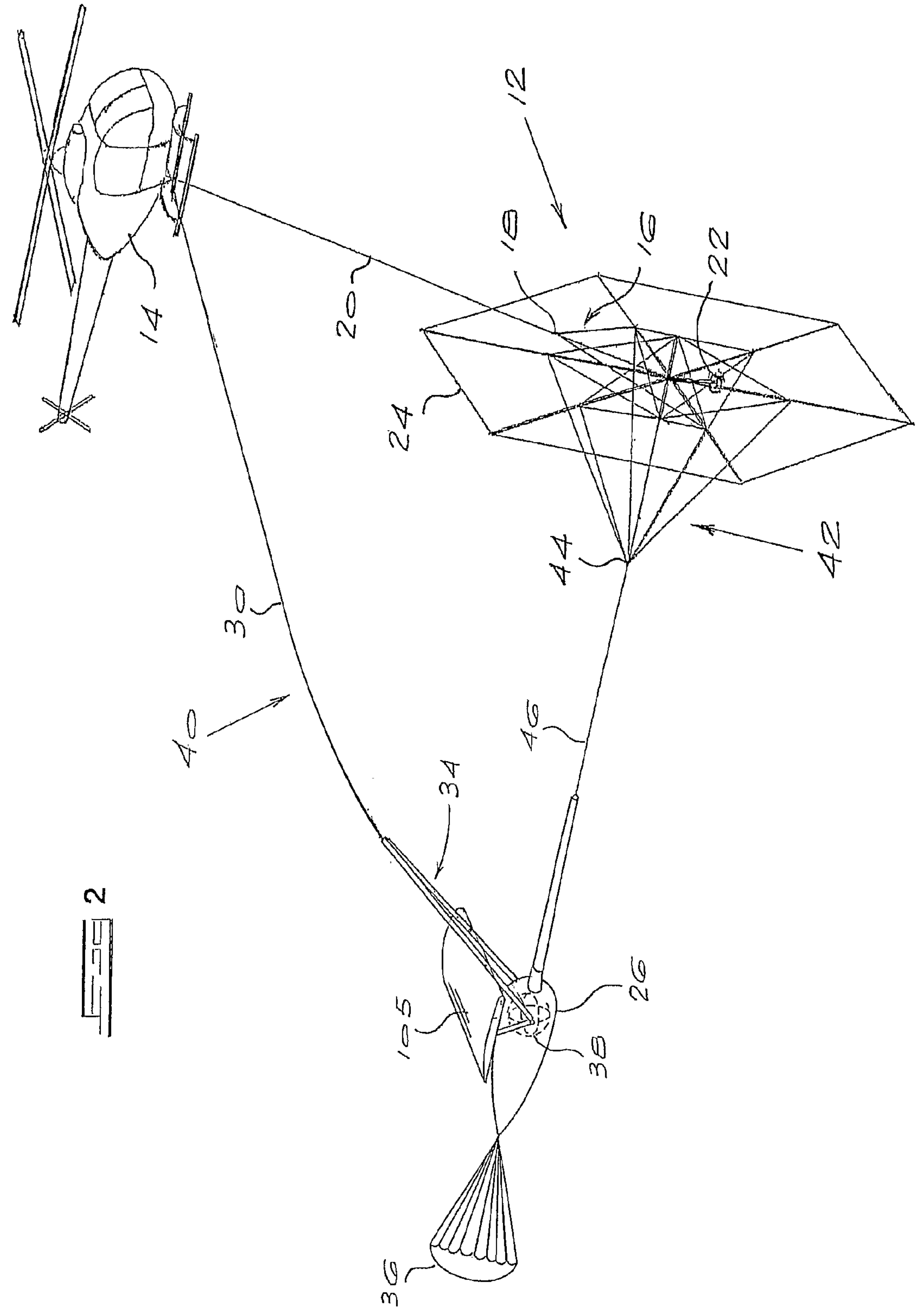
FIG. 2 shows a perspective view of an airborne electromagnetic prospecting system according to a second embodiment of the invention.

FIG. 2 shows an alternative embodiment 40 of the invention, wherein the transmitter loop structure 12 defines a substantially vertical plane as opposed to the horizontal plane illustrated in FIG. 1. The transmitter loop structure 12 has been rotated after liftoff of the towing aircraft 14 using electromechanical means to an angular position of 90° relative to the ground. A tow rope assembly 42 connects the transmitter loop structure 12 to the high drag bird 26. The assembly 42 comprises six tow ropes that are attached to equally spaced apart contact points on the transmitter loop structure 12 and to point 44, which connects the tow rope assembly 42 to the bird 26 via tow rope 46.

Figure 4:
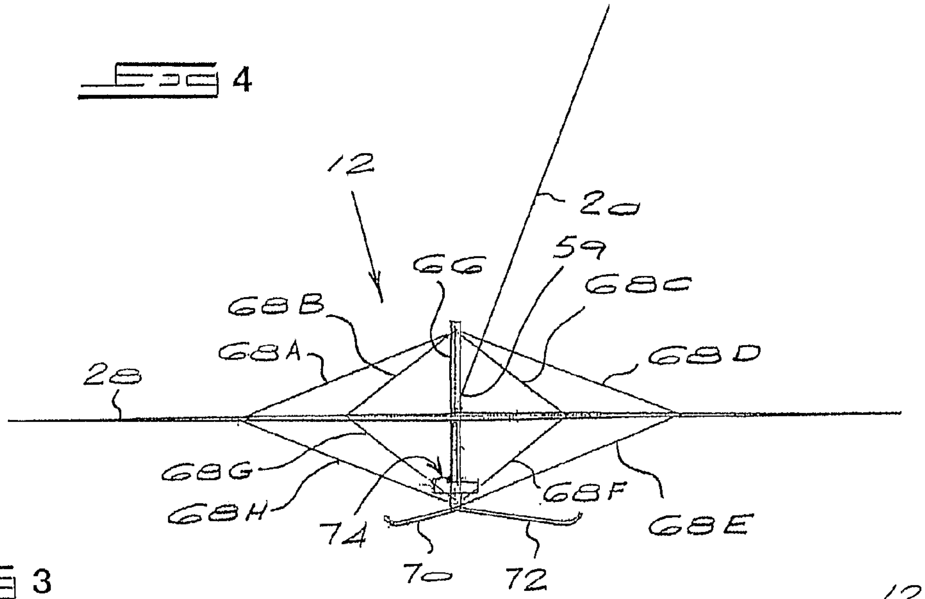
FIG. 4 shows a side view of a transmitter loop structure according to the invention.
Figure 3:
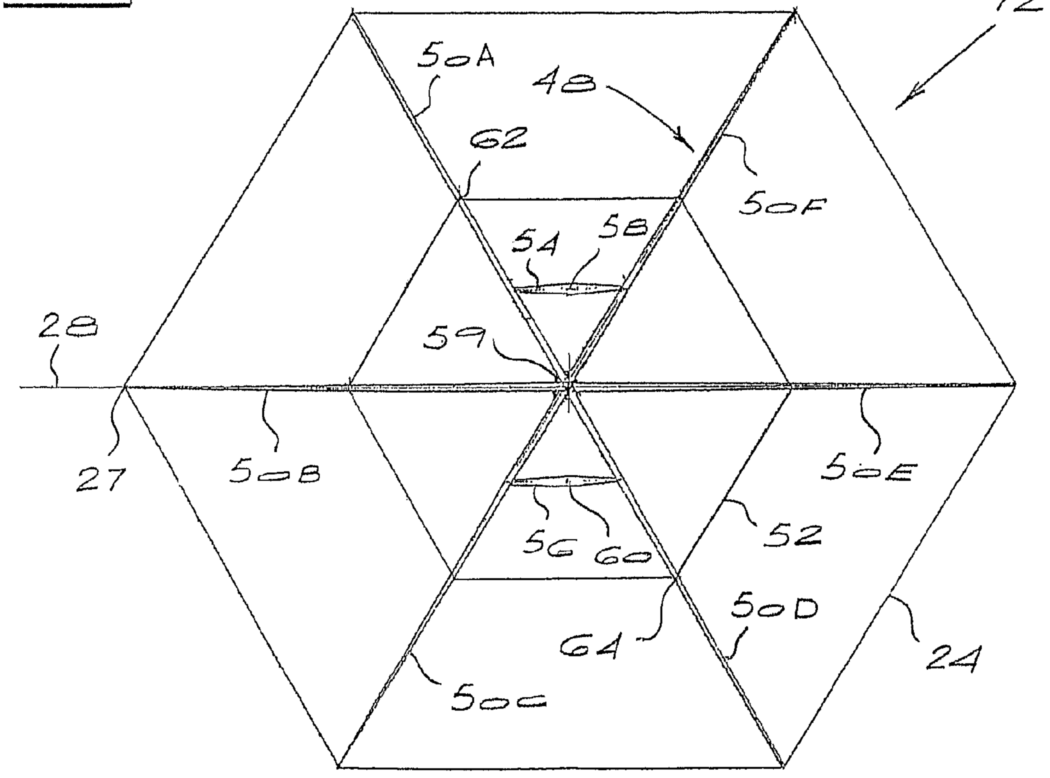
FIG. 3 shows a plan view of a transmitter loop structure according to the invention.

Referring to FIGS. 3 and 4, the large transmitter loop structure 12 includes a spider 48 comprising a plurality of radial frame components or legs 50A to 50F, typically constructed from either fiberglass or a carbon fibre composition. The transmitter loop wire 24 extends between the legs or components 50A to 50F.

Support cord 52, comprising six lengths of cable or rope which are electrically insulated from each other, also extends between the legs or components 50A to 50F for supporting the structure 12.

A pair of diametrically opposed beams 54 and 56, typically constructed from either fibreglass or a Kevlar™ composite, are secured to legs 50A and 50F, and 50C and 50D, respectively. These beams 54 and 56, as well as the central hub, define three contact points, 58, 59 and 60, respectively, for receiving the three tow ropes of tow rope assembly 16 in the embodiment shown in FIG. 1. In the FIG. 2 embodiment, wherein the transmitter loop structure 12 is substantially vertical, the attachment points for the tow rope assembly 16 are defined at 62, 59 and 64.

The legs 50A to 50F extend from a central support post 66, typically constructed from a fibreglass or carbon fibre composite tube. The post 66 provides support for the transmitter loop structure 12, with twelve brace elements 68A, 68B, 68C, 68D, 68E, 68F, 68G and 68H, and four others that are not shown, extending from the post 66 towards points approximately mid way along the lengths of the legs 50A and 50F.

Legs 70 and 72 are pivotally connected to the bottom of the central support post 66 with the legs typically being constructed from flexible fibreglass composite tubes. The legs 70 and 72, together with a third leg (not shown), define a tripod for reducing landing impacts and to support the transmitter loop structure 12 in an approximately horizontal position whilst it is sitting on the ground.

Figures 5, 6, 7:
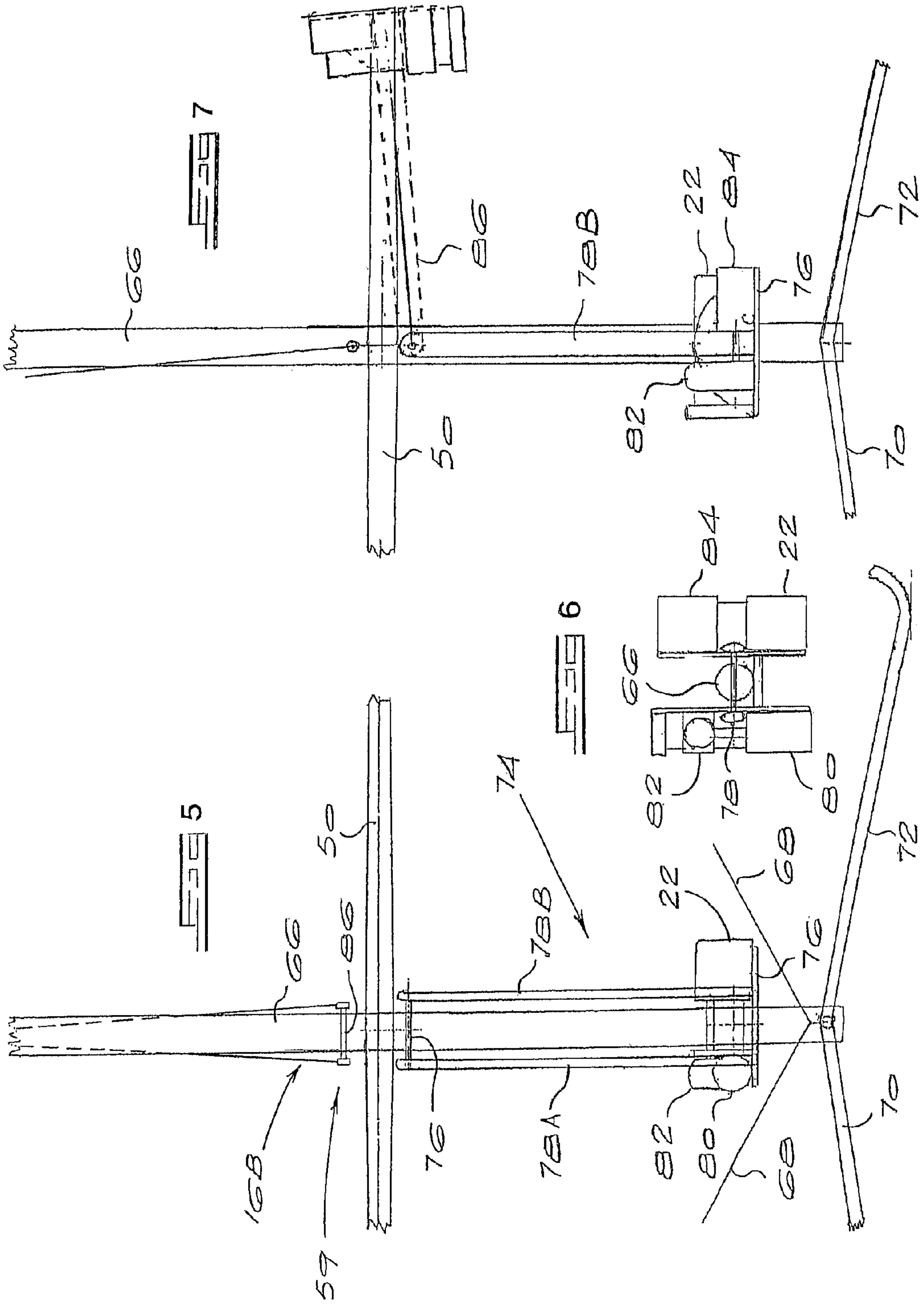
FIG. 5 shows a front view of a transmitter mounted to a support post of the transmitter loop structure.
FIG. 6 shows a plan view of the transmitter shown in FIG. 5.
FIG. 7 shows a side view of the transmitter shown in FIGS. 5 and 6.

Turning now to FIGS. 5, 6 and 7, a carriage assembly 74 is pivotally connected to the central support post 66 by means of a pivot pin 76 mounted to the post 66. The carriage assembly 74 comprises a platform 76, which is mounted to the pivot pin 76 by a pair of arms 78A and 78B, which extend on either side of the post 66. The platform 76 is arranged to carry the transmitter 22, a generator 80 for generating power for the transmitter 22 and other electronics, as well as a 15 kW petrol engine 82, for driving he generator 80, and associated fuel tank 84 for the engine 82.

FIG. 5 clearly shows contact point 59, which allows central ropes 16B of the tow rope assembly 16 to be attached to the central support post 66. The contact point comprises a pivot pin 86, mounted to the post 66, around which the central ropes 16B are secured. The spaced apart tow ropes 16B on either side of the central support 66 are arranged so that they meet at a point approximately 1 m above the support wire 68D, which ensures that the central tow ropes are allowed to rotate clear of the support wire 68D, as the entire tow rope assembly 16 rotates during forward flight and as the airspeed varies during a survey. In this survey configuration, the outer tow ropes of the tow rope assembly 16, serve to supply additional roll stability to the transmitter loop structure 12.

Pitch stability for the transmitter loop structure 12, when flown in the horizontal position shown in FIG. 1, is provided by the tension in the tow rope 28 at the tow point 27. Additional pitch and roll stability is provided by the weight of the transmitter 22, which is in a fixed position approximately 2 m below the tow point 59. The plane of the transmitter loop structure 12 will be aligned with the receiver bird 26 during survey flight. In this configuration, yaw stability is also provided by the tension in the tow rope 28 at the point 27.

From FIGS. 5, 6 and 7, it is clear that the transmitter 22 can be made to rotate from a first position in which it is adjacent the post 66, as shown in FIGS. 1 and 5, and in solid outline in FIG. 7, to a second position in which it lies substantially normal to the support post 66, as shown in FIG. 7 in broken outline 86. Thus, for the embodiment shown in FIG. 2, the transmitter loop structure 12 can be orientated from its horizontal plane position on the ground to its vertical plane position in flight. This configuration is optimum for the detection of steeply dipping conductors, whereas the configuration where the transmitter loop structure is horizontal, is optimum for the detection of flat lying conductors and for airborne electromagnetic sounding.

It is clear from FIGS. 2, 4 and 7, that when the transmitter 22, which weighs approximately 50 kg, when compared to the approximate weight of the transmitter loop structure 12, of around 100 kg, is rotated after liftoff to the position 86 shown in FIG. 7, this action will in turn cause the transmitter loop structure 12 to rotate to a vertical planar position.

From FIG. 4, the tow rope assembly 16 is attached at its central point 59, substantially at the centre of gravity of the transmitter loop structure 12. When the transmitter loop structure 12 is lifted into the air, the structure 12 will remain substantially horizontal, provided the relatively heavy transmitter remains at its liftoff location, which is about 2 m vertically below the centre of the tow point assembly 59.

If the transmitter 22 is now rotated by electromechanical means (not shown) slowly through an angle of about 94° degrees so that its centre of gravity is aligned with the plane of the composite tubes 50A to 50F, which support the transmitter loop, it will cause the transmitter loop structure 12 to rotate to a vertical position. This is a reset of the heavy transmitter, which is now located approximately 1.7 m vertically below the tow point 49 and centre of gravity of the transmitter loop structure 12. Conveniently, the carriage assembly 74 is arranged to rotate into a sector defined between a pair of adjacent legs 50A to 50F and not into one of the legs, so that it can be rotated by the required 94° to align it with the plane of the legs.

If the helicopter now proceeds with forward flight, the high drag bird 26 will take up its position directly behind the transmitter loop structure, and as the forward speed increases, it will pull the cable 46 and tow rope assembly 42 tight. This ensures that the separation and alignment of the transmitter and receiver coils are essentially kept constant for a range of survey speeds.

After the survey flight is completed, the landing of the system is carried out by reducing the forward speed to zero and then rotating the transmitter 22 slowly back by 94° to its original liftoff position as shown in FIG. 5 The transmitter loop structure 12 will then rotate back to its horizontal position, thereby allowing it to be lowered to the ground.

Figure 8:
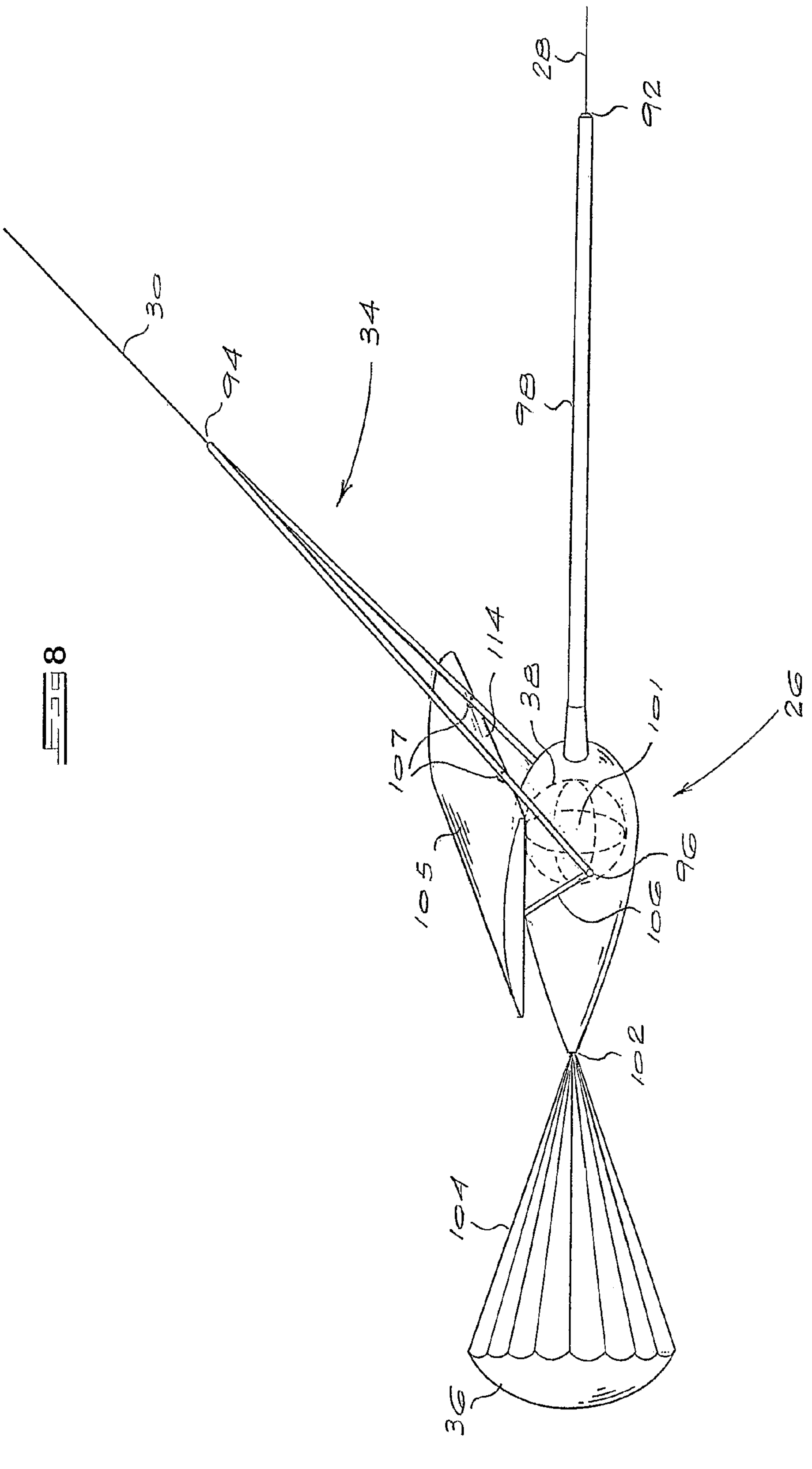
FIG. 8 shows a detailed side view of a high drag bird used in the prospecting system of the present invention.

Turning now to FIG. 8, a long tube 98 is connected to tow rope 28 at point 92 and the yoke assembly 34 is connected b tow rope 30 at point 94. The yoke assembly 34 is connected to the bird 26 by a bearing assembly 96. A wing 105 is connected at its leading edge to the yoke assembly 34 at points 107 and at its trailing edge to the support arms 106 burning flight, the forces acting on the bird 26 are its weight vertically downwards, the lift on the wing 105 which acts essentially upwards, the aerodynamic and gravitational forces on the yoke 34, the drag on the drogue 36 horizontally backwards, the tension in the tow rope 28 horizontally forwards and the tension in the angled tow rope 30.

Advantageously, the vertical component of the tension in the angled tow rope 30 together with the vertical component of the lift forces from the wing 105 and the angled yoke 34 exactly balances the downward weight of the bird 26. It should be clear from FIG. 8 that the longer the long tube 98, the better will be the yaw and pitch stability of the bird 26 during flight. Likewise, a longer yoke 34 will improve the roll stability of the bird 26 during flight.

Additional pitch and yaw stability is provided by both the drogue 36 and the long tube 98. Apart from its aerodynamic purpose of keeping the neutral point of the bird as far back as possible, the purpose of the long tube 98 is ϕ balance the bird 26 so that its centre of gravity is at point 101, which is in line with the yoke bearings 96 and also at the centre of the receiver coils 38. This arrangement ensures optimum pitch, roll and yaw stability for the bird and receiver coils during flight.

The drogue 36 provides a horizontal, backward force acting at point 102, which will result in pitch and yaw stability. The long narrow tube 98 has the advantage of moving the neutral point of the bird only slightly forward, compared to what it would be for the streamlined bird shell on its own without the balance tube being present. For a streamlined body of rotation such as the bird shell, the neutral point is usually considerably ahead of the centre of gravity 101 of the body, which provides a destabilizing force on the bird 26 during flight. The further back the neutral point is relative to the centre of gravity and the inline tow point bearings 96 of the bird 26, the better will be the bird's pitch and yaw stability.

The receiver coils 38 are mounted at the centre of gravity 101 of the bird, which reduces rotation of the coils in the earth's field during turbulent flight, which advantageously leads to reduced system noise levels.

The drogue 36 is constructed of a highly porous mesh fabric, which reduces turbulence created by the drogue 36 as it is dragged through the air. The porous mesh creates very small turbulent vortices behind the drogue, rather than one relatively large vortex as would be the case with a conventional large non-porous drogue element. This results in an essentially nonturbulent drag force being created at the back of the bird. It should be appreciated that other types of drag elements can be constructed that have a porous mesh or string type structure in order to provide a drag force that is as constant and smooth as possible. This together with elasticated drogue ropes 104 reduce the amount of mechanical vibration, which is transmitted from the drogue 36 to the bird 26. These vibrations are ultimately transmitted albeit with greatly reduced amplitudes through the receiver coil suspension system into the receiver coil, which then produce system noise. Noise is generated by angular vibration (rotation) of the receiver coils in the magnetic field of the earth, which is very strong when compared to the electromagnetic fields being measured.

It will be appreciated that the drogue 36 could rather be attached directly to the yoke bearing assembly 96 by means of another rearward facing yoke or by means of two ropes running backwards from the yoke bearing assembly 96 to the apex of the elasticated drogue ropes 104. In this case the aerodynamic drag forces acting on the drogue 36 are transmitted directly to the yoke bearing assembly 96. This alternative drogue attachment location will result in the pitch angle of the high drag bird 26 together with the enclosed receiver coils 101 always to be aligned with the pitch angle of the transmitter loop as the airspeed varies through a considerable range. In the first mentioned location for attaching the drogue at the rear end of the bird shell, as the airspeed decreases or increases, the direction of airflow over the drogue will be slightly different from that of the varying direction of alignment between the high drag bird and the transmitter loop. This will occur because in this case the drogue is attached at some distance from the yoke bearing assembly pivot point and therefore a pitching couple will be exerted on the bird as the airspeed decrease or increases which will result in the bird's alignment in pitch being slightly different from that of the transmitter loop. This will then generate a coupling change between the transmitter loop and the receiver coil, which is a potential source of noise in the system.

The combination of all these design features in the bird 26 thus lead to reduced roll, pitch and yaw motions during flight of the bird 26. This results in reduced rotation of the receiver coils in the earth's field and also keeps the transmitter-receiver coil geometry essentially constant. These features serve to reduce system noise, and thereby considerably improve the interpretation of the prospecting data.

The purpose of the wing 105 is to provide additional lift to the receiver bird 26. This enables the size of the drogue 36 to be reduced and/or for the helicopter electromagnetic system of the invention to be flown at lower airspeeds. The reason for this is that a smaller drogue force will then be required at low airspeeds in order to keep tension on the tow ropes 28 and 30 and hence to maintain the essentially constant transmitter receiver geometry. As the airspeed drops, drag will be reduced on the transmitter loop 12 and on the receiver drogue 36. This results in rotation of the tow cables 20, 28 and 30 in an anti-clockwise direction, as viewed on the drawing, thereby increasing the angle of attack of the wing 105. This action increases the lift to the receiver bird at these low airspeeds compared to what it would have been if the rotation had not taken place.

The wing 105 therefore allows the system to be flown at lower airspeeds whilst still maintaining the essentially fixed transmitter receiver geometry. If the airspeed increases substantially above the nominal survey airspeed, the angle of attack of the wing 105 will decrease and may even become slightly negative. This action reduces the lift from the wing 105 until it is zero or even slightly negative. This reduction in lift, however, only affects the transmitter receiver geometry slightly, provided that the increased drag on the drogue 36 and the tow cable 30 at the higher airspeeds is sufficient in order to keep tow cables 28 and 30 under tension.

The wing 105 is shown as being of solid form, but it will be apparent that in order to save weight, it could be constructed as a collapsible cloth element similar to the wing of a paraglider or microlight aircraft. In this case, the trailing edge supports 106 could be constructed from thin ropes rather than as stiff members as shown in FIG. 8. It will also be appreciated that the wing can be located in other positions relative to the receiver bird fuselage. For example, it can be located extending outwards from the yoke at the yoke bearing. Alternatively it could be located on the fuselage of the receiver bird immediately behind or above the yoke bearing. A wing such as this is used on the high drag receiver bird, which is described in Canadian patent no. 941446 to Viano Ronka.

The primary advantage of the present system is that the fixed triad geometry of the components allows the relative positions of the transmitter coils on the transmitter structure and the receiver coils in the high drag bird to be kept substantially constant for a range of airspeeds of the airborne electromagnetic system. In particular, the bird 26 is arranged to be kept substantially aligned with the transmitter loop structure 12. This facilitates the accurate quantitative interpretation of the recorded airborne electromagnetic data.

In addition, the drogue 36 serves another important role in that by keeping the carrier 26 stable, the rotation of the receiver coils 38 in the earth's magnetic field, which is a major cause of noise and interference, is significantly reduced.

Furthermore, and coupled to the previous two advantages, the tow cable 30 prevents the receiver bird 26 from dropping too low if the airspeed falls significantly, which is not possible with the system disclosed in SA patent no. 98/11489. Thus, provided the drogue 36 is sufficiently large so that its drag or significantly reduced airspeeds, exceeds the horizontally forward component of the tow force acting on the tow rope 30, together with the tow force acting on tow rope 28, the essentially fixed triangular geometry between the transmitter, receiver and helicopter will be maintained. Lastly, the wing 105 provides additional lift at lower airspeeds such as those encountered when surveying up large hills. This enables the fixed triad geometry of the system to be maintained at these lower airspeeds. The receiver bird will thus have a greatly reduced probability of striking the ground when surveying at a typical flying height of 40 m above the ground surface in hilly terrain.

It is thus clear that the primary difference between the present invention and the invention described in SA Patent No. 98/11489 is the additional tow rope 30 which results in the following improvements. Firstly, it provides an essentially fixed geometry especially between the transmitter coil and the receiver coil, but also between these and the towing helicopter. This is because these three elements are connected by three nearly straight tow ropes and the aerodynamic and weight forces act on these in such a way as to keep this geometry essentially fixed. The forces acting on the large transmitter loop structure are a large weight acting downwardly, a tow cable force acting in a forward and upward direction, and a considerably smaller drag force acting horizontally rearwardly. The forces acting on the towed receiver bird are a large drag force horizontally rearwardly, a fairly small force acting in a horizontal forward direction along the tow cable, a moderately large force acting forwardly and upwardly towards the helicopter, a small force acting mainly upwards on the wing, and a fairly large bird weight force acting vertically downwardly. The forces acting on the helicopter can be split into its components which are a large weight force acting downwardly mainly from the transmitter loop and its structure but also from the receiver bird, and a small drag force horizontally backwards from the transmitter loop and from the receiver bird. An analysis of these forces show that they operate over a sufficiently wide survey speed range in such a way as to keep the geometry between the transmitter and receiver and helicopter essentially constant. This fixed geometry is advantageous for mineral prospecting because the geometry between the transmitter, the receiver and the ground surface must be known as accurately as possible for optimum detection of mineral deposits.

The invention claimed is:

1. An airborne electromagnetic prospecting system, comprising:

a transmitter loop structure that is attached to, and arranged to be towed by, a towing aircraft;

transmitting means fitted to the transmitter loop structure for transmitting a primary electromagnetic field;

receiving means for receiving a primary and a secondary resulting electromagnetic field, the secondary resulting electromagnetic field arising from the interaction of the primary field with ground conductors that are traversed by the towing aircraft; and a high drag bird attached to, and arranged to be towed by, the transmitter loop structure and the towing aircraft, the high drag bird comprising a body housing the receiving means, a rigid nose extending from the body for allowing the high drag bird to be connected to the transmitter loop structure, and a yoke assembly extending from the body for allowing the high draft bird to be connected to the towing aircraft, so as to keep apositional geometry and an angular geometry of the receiving means relative to the transmitting means substantially constant over a range of airspeeds, and wherein a drogue is fitted to the high drag bird so as to keep the high drag bird substantially in line with the transmitter loop structure.

2. An airborne electromagnetic prospecting system according to claim 1, wherein the towing aircraft is a helicopter.

3. An airborne electromagnetic prospecting system according to claim 1, wherein the drogue is a high drag drogue, with the drogue being connected to either the body housing, the receiving means or the yoke assembly.

4. An airborne electromagnetic prospecting system according to claim 1, wherein the high drag bird further comprises a wing.

5. An airborne electromagnetic prospecting system according to claim 1, wherein the transmitter loop structure comprises:

a central hub to which a carriage assembly is pivotally connected for carrying the transmitting means;

a spider comprising a plurality of legs extending radially away from the central hub; and at least one transmitter loop wire extending around the plurality of legs.

6. An airborne electromagnetic prospecting system according to claim 1, wherein the transmitter loop structure is attached to the towing aircraft by a tow rope assembly comprising a plurality of tow ropes that are attached to spaced apart contact regions on the transmitter loop structure, the plurality of tow ropes being conjoined at a point, which in turn is connected to the towing aircraft by a further tow rope.

7. An airborne electromagnetic prospecting system according to claim 1, wherein, in use, the transmitter loop structure defines a horizontal plane, with a tow rope extending between the high drag bird and a peripheral point of the transmitter loop structure.

8. An airborne electromagnetic prospecting system according to claim 1, wherein, in use, the transmitter loop structure defines a substantially vertical plane, with a top rope assembly connecting the transmitter loop structure to the high drag bird.

* * * * *